(12) United States Patent
Mosoi et al.

(10) Patent No.: US 8,849,865 B1
(45) Date of Patent: Sep. 30, 2014

(54) QUERYING A DATA STORE OF IMPRESSIONS

(75) Inventors: Alexandru Mosoi, Bacau (RO); Silviu Ganceanu, Vaslui (RO); Dawn Chamberlain, Mountain View, CA (US); Barbara Stanley, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 1112 days.

(21) Appl. No.: 12/192,585

(22) Filed: Aug. 15, 2008

Related U.S. Application Data

(60) Provisional application No. 60/956,242, filed on Aug. 16, 2007.

(51) Int. Cl.
*G06F 17/30* (2006.01)

(52) U.S. Cl.
USPC .......................... 707/797; 707/713

(58) Field of Classification Search
CPC .................... G06F 17/30463; G06F 17/30324; G06F 17/30961
USPC .................................. 707/797, 713
See application file for complete search history.

(56) References Cited

U.S. PATENT DOCUMENTS

| | | | |
|---|---|---|---|
| 6,216,134 B1 * | 4/2001 | Heckerman et al. | 707/749 |
| 6,278,992 B1 * | 8/2001 | Curtis et al. | 707/711 |
| 6,493,717 B1 * | 12/2002 | Junkin | 707/754 |
| 6,662,184 B1 * | 12/2003 | Friedberg | 707/754 |
| 6,665,656 B1 * | 12/2003 | Carter | 707/748 |
| 6,721,736 B1 * | 4/2004 | Krug et al. | 707/634 |
| 6,842,755 B2 * | 1/2005 | Maslov | 717/115 |
| 7,062,504 B2 * | 6/2006 | Cantu-Paz et al. | 707/688 |
| 7,185,077 B1 * | 2/2007 | O'Toole et al. | 709/223 |
| 7,720,838 B1 * | 5/2010 | Li et al. | 707/713 |
| 7,734,601 B2 * | 6/2010 | Weber et al. | 707/695 |
| 7,765,236 B2 * | 7/2010 | Zhai et al. | 707/797 |
| 7,836,090 B2 * | 11/2010 | Perrizo et al. | 707/797 |
| 7,840,534 B2 * | 11/2010 | Weber et al. | 707/611 |
| 7,882,100 B2 * | 2/2011 | Andrei | 707/714 |
| 7,890,484 B1 * | 2/2011 | Hall | 707/705 |
| 7,941,420 B2 * | 5/2011 | Chitrapura et al. | 707/709 |
| 8,019,786 B2 * | 9/2011 | Nevin, III | 707/797 |
| 8,024,314 B2 * | 9/2011 | Wang et al. | 707/706 |
| 8,224,862 B2 * | 7/2012 | Sacks | 707/797 |
| 8,326,883 B2 * | 12/2012 | Pizzorni et al. | 707/795 |
| 8,458,222 B2 * | 6/2013 | Bobick et al. | 707/797 |
| 2002/0087596 A1 * | 7/2002 | Lewontin | 707/513 |
| 2005/0246231 A1 * | 11/2005 | Shkedi | 705/14 |
| 2005/0273772 A1 * | 12/2005 | Matsakis et al. | 717/136 |
| 2006/0218301 A1 * | 9/2006 | O'Toole et al. | 709/244 |
| 2006/0253465 A1 * | 11/2006 | Willis et al. | 707/100 |
| 2010/0146004 A1 * | 6/2010 | Sim-Tang | 707/797 |
| 2010/0174714 A1 * | 7/2010 | Asmundsson et al. | 707/737 |
| 2010/0268773 A1 * | 10/2010 | Hunt et al. | 709/203 |
| 2012/0265744 A1 * | 10/2012 | Berkowitz et al. | 707/705 |

\* cited by examiner

*Primary Examiner* — Robert Beausoliel, Jr.
*Assistant Examiner* — Alexandria Bromell
(74) *Attorney, Agent, or Firm* — Fish & Richardson P.C.

(57) ABSTRACT

Systems, methods and computer program products identify a plurality of webpage attributes, where each of the plurality of webpage attributes is associated with a value. A date tree is built, the data including a plurality of nodes identifying the values associated with the plurality of webpage attributes, and is optimized by deleting one or more of the plurality of nodes. The number of web pages associated with at least one of the plurality of nodes in the optimized data tree is then determined.

38 Claims, 13 Drawing Sheets

QUERYING A DATA STORE OF IMPRESSIONS

RELATED APPLICATION DATA

This application claims priority to U.S. Provisional Patent Application Ser. No. 60/956,242, filed Aug. 16, 2007, titled "Querying a Data Store of Impressions", the disclosure of which is incorporated herein by reference in its entirety as if set forth fully herein.

FIELD

This document relates to the querying of a large data store of impressions.

BACKGROUND

Internet advertisers attempt to place Internet ads on web pages that are likely to generate revenue. In assessing web pages that are likely to generate revenue, advertisers can look for pages having a certain set of attributes associated with viewers. Web page attributes can include the location of a viewer, including the viewers country, city, state, metro region, and/or zip/postal code, time of day the user is viewing a page, the viewer's browser type, the viewer's operating system, the viewer's browser language, the date, and other criteria associated with a viewer. For instance, if an advertiser knows that the target audience for a product is a female in the Southeast, the advertiser can seek to place ads on websites most likely to be viewed by females in the Southeast.

Currently, webpage attributes can be collected and stored so that the attribute may be later searched to identify web pages that an advertiser may wish to advertise on. Attributes for each webpage can be stored, and can include 20 or more attributes each having numerous values. For instance, a gender attribute may have two values, male and female. The number of combinations of attributes and their associated values for Internet webpages is potentially enormous, creating difficulties in storing and searching through attributes to identify webpages desirable to an advertiser.

SUMMARY

According to an aspect, there is disclosed a method. The method includes identifying a plurality of content item (e.g., webpage) attributes, where each of the plurality of content item attributes is associated with a value. The method also includes building a data tree that includes a plurality of nodes identifying the values associated with the plurality of content item attributes, and optimizing the data tree to generate an optimized data tree including deleting one or more of the plurality of nodes. The method also includes determining the number of content items associated with at least one of the plurality of nodes in the optimized data tree.

According to another aspect, there is disclosed a method including storing a data tree comprising a plurality of nodes, where each node is associated with at least one content item attribute, and where each node stores a number of content items satisfying the at least one content item attribute. The method also includes optimizing the data tree to generate an optimized data tree by deleting one or more of the plurality of nodes.

These general and specific aspects may be implemented using a system, a method, or a computer program, or any combination of systems, methods, and computer programs.

DETAILED DESCRIPTION

Figure 1:
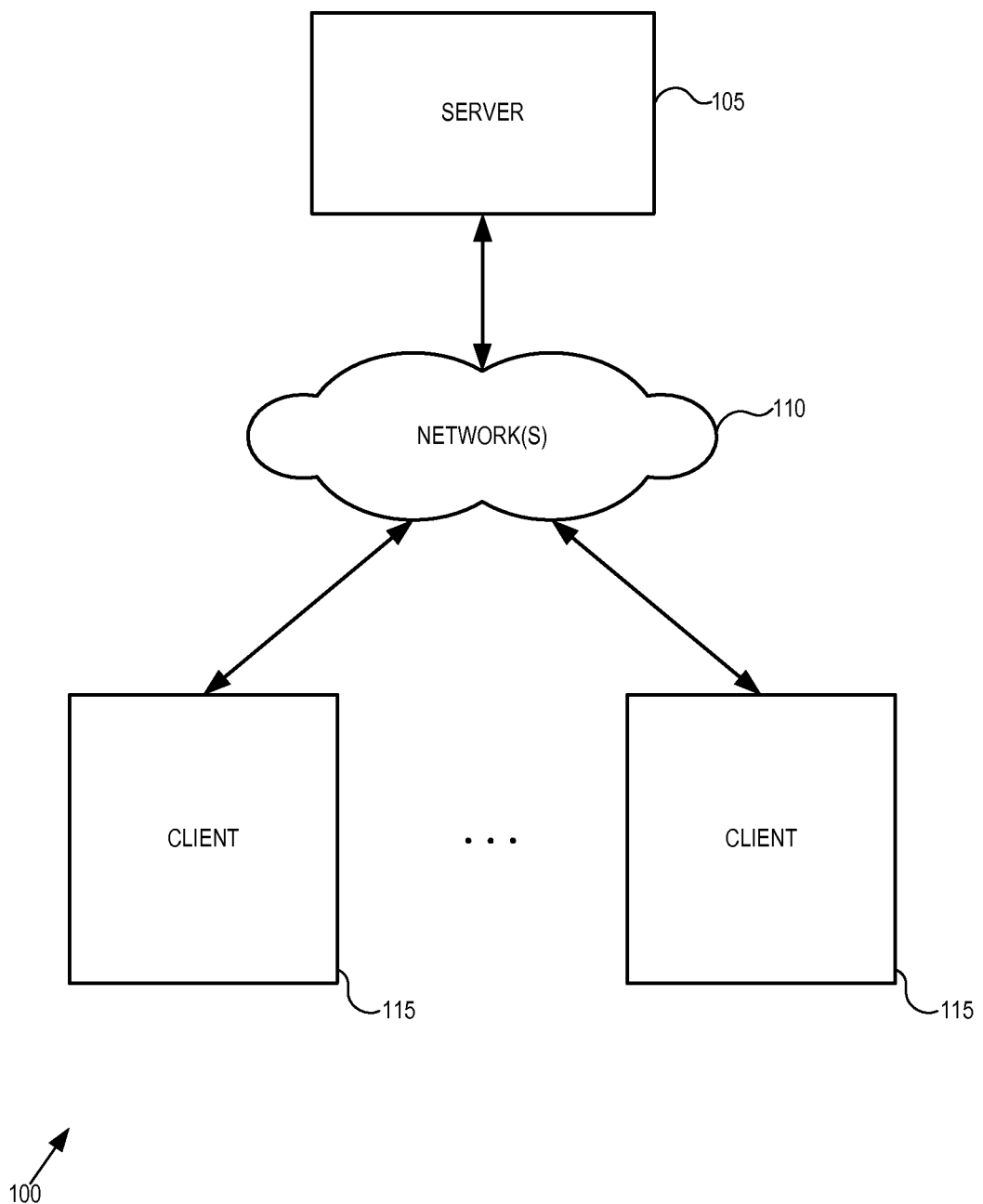
FIG. 1 shows an example advertising system.

The present disclosure now will be described more fully hereinafter with reference to the accompanying drawings, in which some, but not all implementations are shown. Indeed, these implementations can be embodied in many different forms and should not be construed as limited to the implementations set forth herein; rather, these implementations are provided so that this disclosure will satisfy applicable legal requirements. Like numbers refer to like elements throughout.

The following disclosure describes systems, methods, and computer program products that provide content items (e.g., advertisements or "ads") to users, such as via a user's Internet browser. Implementations described provide users with the ability to select one or more advertisements a user wishes to view. This selection can occur prior to viewing a video, such as a free video, or can occur during or after the playing of a video. Although the disclosure focuses on videos and video advertisements, implementations are applicable to selection of content in any media form, including graphics, audio, text, and the like. Additionally, the selection of such content can occur prior to, during, or after a user receives any content, for instance, audio, access to web pages, downloadable programs, or the like.

This disclosure is described with reference to block diagrams and flowchart illustrations of methods, apparatuses (i.e., systems) and computer program products in the context of an advertising delivery service. It will be understood that blocks of the block diagrams and flowchart illustrations, and combinations of blocks in the block diagrams and flowchart illustrations, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function(s) specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the function(s) specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 shows an example advertising system 100. The system 100 generally includes at least one server 105 in communication with one or more clients 115 via at least one network 110. The clients 115 can each include a device, such as a personal computer, a wireless telephone, a personal digital assistant (PDA), a lap top computer, or another type of computation or communication device, a thread or process running on one of these devices, and/or an object executable by one of these devices. The server 120 can include one or more servers that gather, store, process, maintain, and/or manage web page impressions, including webpage attributes, and process complex queries. The complex queries can be used to search the stored webpage attributes to identify web pages that an advertiser may wish to advertise on.

Although two clients 115 and a single server 105 are illustrated in FIG. 1, there can be more servers and more or fewer clients. For instance, some of the functions performed by the server 105 can be performed by one or more other servers such that the server 105 can represent several devices, such as a network of computer processors and/or servers. The network(s) 140 can include one or more local area networks (LANs), wide area networks (WANs), telephone networks, such as the Public Switched Telephone Network (PSTN), intranets, the Internet, and/or or other type of network. The client(s) 115 and server 120 can connect to the network(s) 140 via wired, wireless, or optical or other connections. In alternative implementations, one or more of the devices illustrated in FIG. 1 are directly connected to another one of the devices. For example, in one implementation, the clients 115 are directly connected to the server 120.

Figure 2:
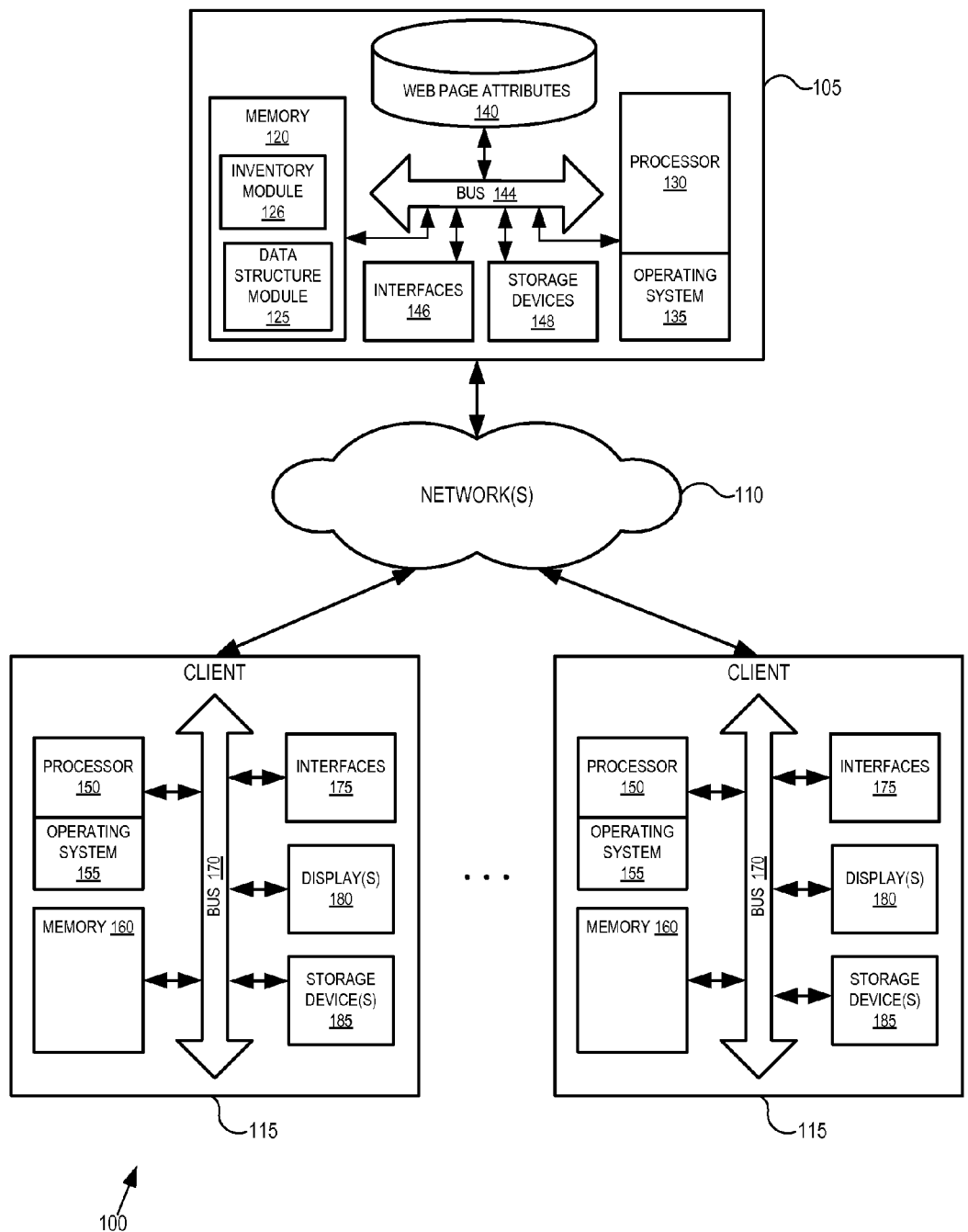
FIG. 2 shows a more detailed view of the example advertising system of FIG. 1.

FIG. 2 shows a detailed view of the system 100 shown in FIG. 1. The server 105 generally includes a processor 130, an operating system 135, a memory 120 including a data structure module 125 and an inventory module 126, a web page attributes database 140, one or more interface(s) 146, one or more storage device(s) 148, and a bus 144. The bus 144 can include one or more paths that permit communication among the components of server 105.

The processor 130 includes any type of conventional processor, microprocessor or processing logic that interprets and executes instructions, and works in conjunction with the operating system 135 to execute instructions stored in the memory 120 and/or storage devices 148 of the server 105. The memory 120 can include a random access memory (RAM) or another type of dynamic storage device that stores information and instructions for execution by the processor 130. The storage device(s) 148 can include a conventional ROM device or another type of static storage device that stores static information and instructions for use by the processor 130. Additionally, the storage device(s) 148 can include a magnetic and/or optical recording medium and its corresponding drive. According to an implementation, although the operating system 135 is shown as separate from the memory 120 and storage device(s) 148, the operating system 135 may be stored within the memory 120 and/or storage device(s) 148.

The server 105 includes one or more interfaces 146 that permit input to the server 105 via one or more conventional mechanisms, such as a keyboard, a mouse, a pen, voice recognition and/or biometric mechanisms, or the like. The interface(s) 146 can also permit output from the server 105 via one or more conventional mechanisms, such as a display, a printer, a speaker, or the like. The interface(s) 146 can further include one or more communication interfaces that enable the server 105 to communicate with other devices and/or systems. For example, the interface(s) 146 can include mechanisms for permitting the server 105 to communicate with the clients 115 via one or more networks, such as the network(s) 110. The interface(s) is 146 can permit the server 105 to communicate with other servers, including Internet servers, to collect webpage impressions and attributes from clients 115 and other Internet servers (not illustrated).

In operation the server 105 can store webpage attributes associated with webpage impressions viewed by users. Webpage attributes may be stored in a data structure that permits complex queries to be answered quickly, and which optimizes the space required for storing such data. According to an implementation, the data structure optimizes the space required for storing data by correlating webpage impressions. The server is further operable to query the data structure to solve complex queries efficiently. In one implementation, the server 105 performs these operations in response to the processor 130 executing software instructions contained in a computer-readable medium, such as the memory 120. In one implementation, the software instructions for building the data structure in which webpage attributes are stored may be contained in a data structure module 125 within the memory 120. The data structure module 125 is operable to build a tree data structure, such as a wildcard tree and/or an AD tree. In an implementation, the software instructions for permitting complex queries to be answered quickly can be contained in the inventory module 126.

The server 105 stores webpage impressions, including webpage attributes in the webpage attributes database 140. Although only a single database 140 is illustrated in FIG. 2, webpage impressions and webpage attributes may be stored in several databases, either internal or external to the server 105. For instance, the server 105 may retrieve webpage impressions and/or webpage attributes from a remote location on the Internet via the interface(s) 146 and the network(s) 110.

The software instructions can be read into the memory 120 from another computer readable medium, such as the storage device(s) 148, or from another device via the interface(s) 146. The software instructions contained in the memory 120 cause processor 130 to perform processes described in this disclosure. Alternatively, hardwired circuitry can be used in place of or in combination with software instructions to implement processes consistent with the disclosure. Thus, implementations are not limited to any specific combination of hardware circuitry and software.

The client device(s) 115 include a processor 150, an operating system 155, a memory 160, one or more interface(s) 146, one or more display(s) 180 one or more storage device(s) 185, and a bus 170. The bus 170 includes one or more paths, such as data and address bus lines, to facilitate communication between the processor 150, operating system 155 and the other components within the client 115. The processor 150 executes the operating system 155, and together the processor 150 and operating system 155 are operable to execute functions implemented by the client 115, including software instructions contained in a computer-readable medium stored in the memory 160.

The memory 160 can include random access memory, read-only memory, a hard disk drive, a floppy disk drive, a DVD or CD Rom drive, or optical disk drive, for storing information on various computer-readable media, such as a hard disk, a removable magnetic disk, or a DVD or CD-ROM disk. Additionally, the interface(s) can control input/output devices of the client 115, such as a video display, a keyboard, a scanner, a mouse or joystick or other input or output devices. The interface(s) can also include one or more input/output ports and/or one or more network interfaces that permit the client 115 to receive and transmit information, such as from and to the server 105, such as via the network(s) 110.

The server 105 and clients 115 illustrated in FIG. 2 support combinations of means for performing the specified functions described herein. As noted above, it will also be understood that each block of the block diagrams, and combinations of blocks in the block diagrams, can be implemented by special purpose hardware-based computer systems that perform the specified functions or steps, or combinations of special purpose hardware and computer instructions. Further, the server 105 and clients 115 can each be embodied as a data processing system or a computer program product on a computer-readable storage medium having computer-readable program code means embodied in the storage medium. Any suitable computer-readable storage medium may be utilized including hard disks, CD-ROMs, DVDs, optical storage devices, or magnetic storage devices. Accordingly, the server 105 and/or clients 115 may take the form of an entirely hardware embodiment, an entirely software embodiment or an embodiment combining software and hardware aspects, such as firmware.

Furthermore, though illustrated individually in FIG. 2, each component of the server 105 and clients 115, respectively, may be combined with other components within the server 105 and/or clients 115 to effect the functions described herein. According to an implementation, one or more clients 115 can store webpage impressions and webpage attributes in addition to or as an alternative to the storage of webpage impressions and webpage attributes by the server 105 or by another entity in communication with the server 105 via the network(s) 110. Thus, the webpage attributes database 140 may be distributed among one or more clients 115.

The disclosure will next describe the function of the system 100 with reference to example data structures generated by the data structure module 125 and an example algorithm for solving complex queries using the data structure generated by the data structure module 125, and with reference to block diagram flowcharts describing example processes implementing the same. Although implementations are described with respect to wildcard tree data structures, implementations consistent with this disclosure may alternatively or additionally utilize AD Trees and other tree structures.

Figure 3:
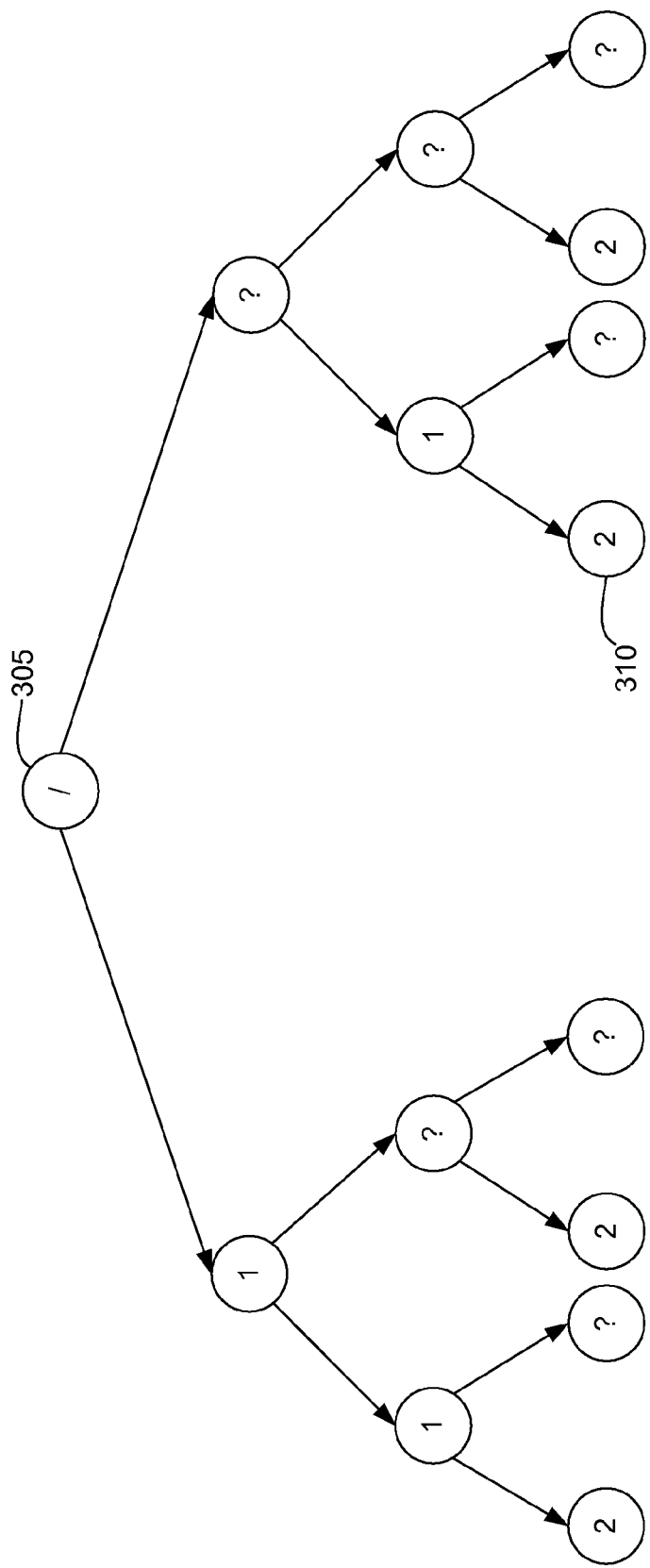
FIGS. 3-5 show example data structures.

FIG. 3 shows an example wildcard tree data structure 300 operable to store values for webpage attributes corresponding to one or more webpage impressions, according to an implementation. Wildcard tree data structures permit the storage of attributes for webpage impressions collected over a period of time. For instance, a wildcard tree data structure can store attributes for a large number of webpage impressions collected over a period of 30 days or more. The wildcard tree data structure can be used to store information required to respond to queries requesting webpage impression data, such as the number of web pages that satisfy some combination of web page attributes. According to one implementation, tables can be used to store the tree nodes, where each node is assigned a key (that identifies the node in the tree) and a value (a list of children or a list of webpage impressions).

In the data structure 300 of FIG. 3, each webpage attribute is associated with a value corresponding to the attribute for a given web page. For instance, a 'country' attribute may have a value of 1 to indicate the U.S., the value of 2 to indicate China, and so on. As another example, a 'browser' attribute may have the value of 1 to indicate the Firefox™ web browser, the value of 2 to indicate Microsoft Internet Explorer, and so on. The values for each attribute are added to the wildcard tree data structure. To support queries that request the value of an attribute that is not present, a wildcard value is inserted into the tree, illustrated as a "?", creating a wildcard path.

Starting from the root of a wildcard tree data structure, web page impressions in the tree can be split by the first attribute, by the second attribute, and so on, as is shown in the data structure 300 of FIG. 3. Each leaf in the wildcard tree can store the number of webpage impressions that follow the path from root down to that particular leaf. For instance, in an example, a leaf 310 can indicate that 2 webpage impressions satisfy all of the attributes between that leaf and the root in the tree structure 300.

In one implementation, to insert a new webpage impression into the wildcard tree, the impression is duplicated for each attribute. One copy follows the path corresponding to the value the webpage impression has for a particular attribute, and one copy follows the wildcard path. In total, each webpage impression will reach $2^N$ leafs, where N is the total number of webpage attributes for a webpage impression. Because the existing wildcard tree structure (i.e., prior to insertion of attributes for a new webpage impression) may not include all the nodes needed for all the $2^N$ paths, missing nodes may be created. The wildcard tree 300 of FIG. 3 shows a webpage impression having three attributes with respective values 1, 1, and 2 into a wildcard tree. For each attribute, a wildcard node exists in the tree 300, so the tree 300 shown in FIG. 3 includes a total of $2^3$ leafs.

Figure 4:
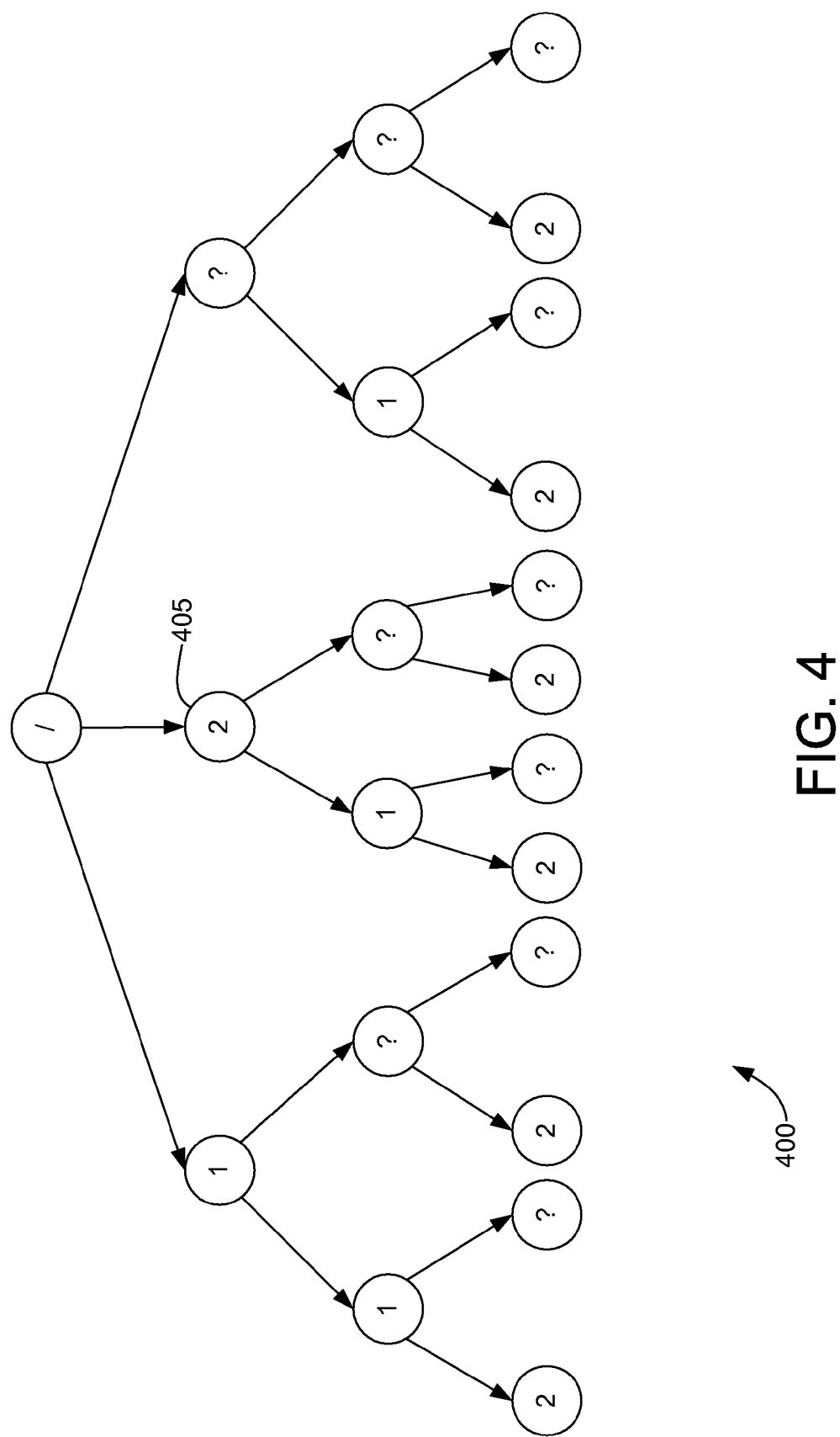

FIG. 4 illustrates a wildcard tree 400 resulting from the insertion of a new webpage impression into the wildcard tree 300 of FIG. 3, according to an implementation. In this example, a web page having three attributes with values 2, 1, and 2, respectively, is inserted (i.e., added) into the tree 300. Because the first attribute (having a value of 2) is the same attribute type as already exists in the wildcard tree 300, and a wildcard node already exists for the same attribute type, only a single new node 405 is inserted for this attribute. Thereafter, nodes are added for each attribute and their corresponding wildcard paths.

Figure 5:
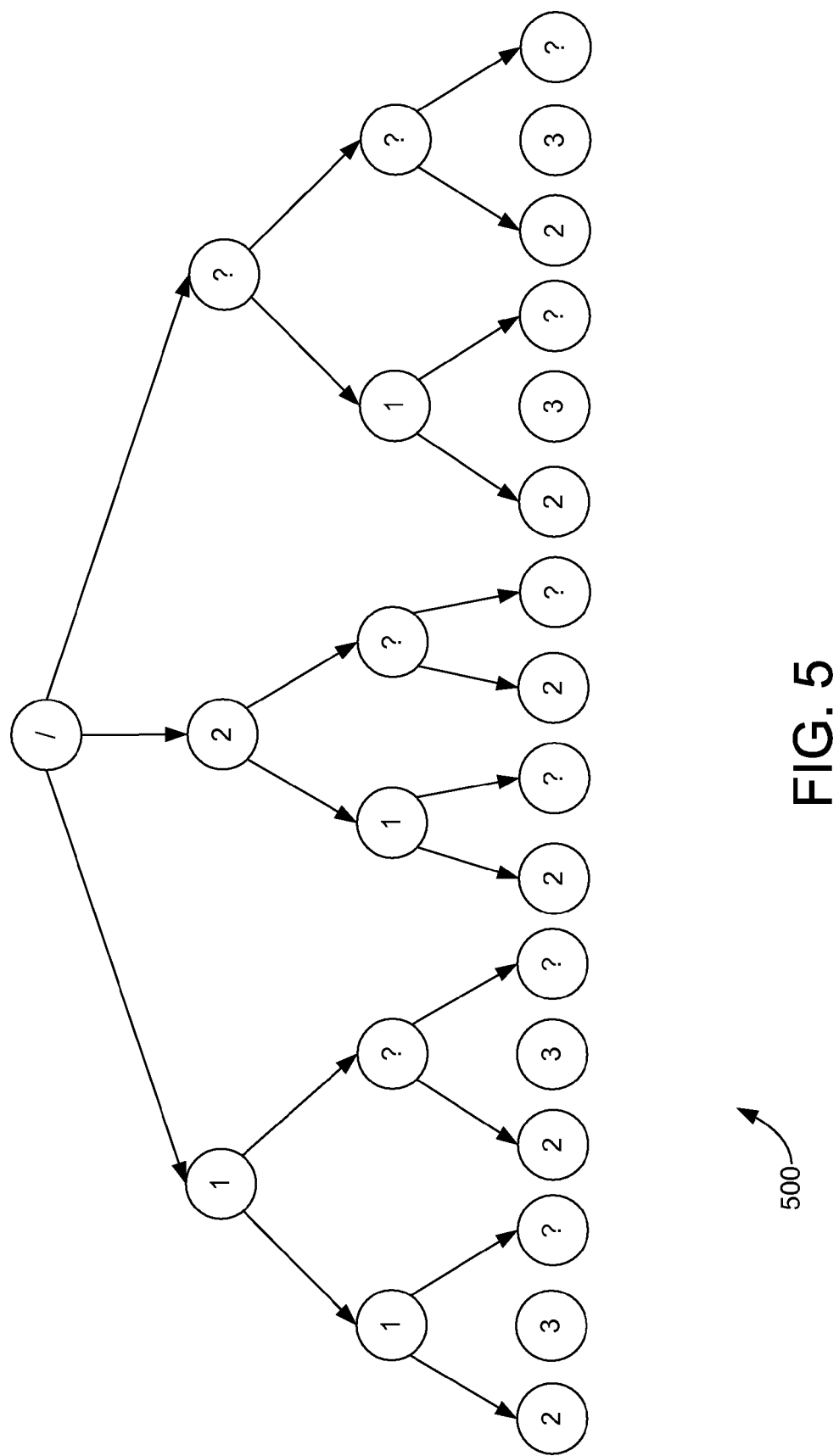

FIG. 5 illustrates an example wildcard tree 500 after the insertion of another web page impression into the tree 400 shown in FIG. 4, according to an implementation. The inserted impression includes the same attributes types, albeit with values of 1, 1, and 3, respectively. Because this new impression is similar to the web page impression having attributes 1, 1, and 2, very few new nodes are created.

For web pages having a large number of attributes, each with numerous possible values, the number of leafs in a wildcard tree can grow to a very large number. As a result, it may be optimal to reduce the size of the tree, which can reduce the storage requirements for the tree and increase the speed with which queries based on the tree structure can be processed. One or several space optimizations can be used which limit the size of the wildcard tree structure.

According to one implementation, nodes that are traversed by fewer than a small number of impressions may be deleted, where the small number of impressions is a number considered statistically irrelevant for achieving a desired forecasting result. For instance, the small number of impressions may be set to 10 so that a leafs having fewer than 10 impressions will be deleted. If a query seeks the number of web pages satisfying a query, where the answer would be stored by a deleted leaf, a 0 can be returned. Therefore, the values for deleted leafs are eliminated, trading some inaccuracy in responding to queries in favor of a smaller tree structure.

Figure 6:
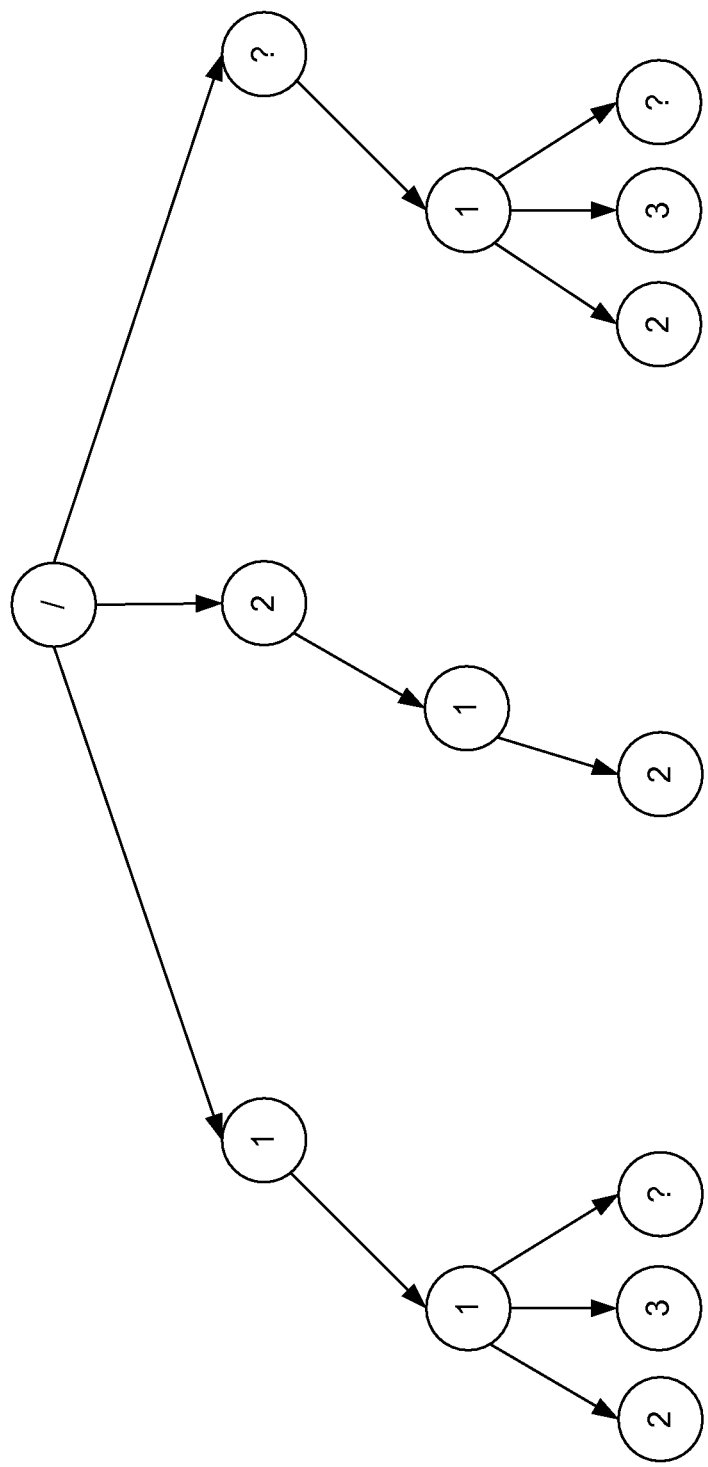
FIGS. 6 and 7 show example optimized data structures.

According to another implementation, if a node has only a predetermined number (e.g., two children (one corresponding to a non-wildcard value and one corresponding to the wildcard)), the wildcard child may be deleted. According to yet another implementation, if nodes and their subtrees share the same information as corresponding nodes, then the duplicates may be removed. For instance, FIG. 6 shows a wildcard tree structure 600 that exists after the deletion of duplicates in the tree structure 500 of FIG. 5.

Figure 7:
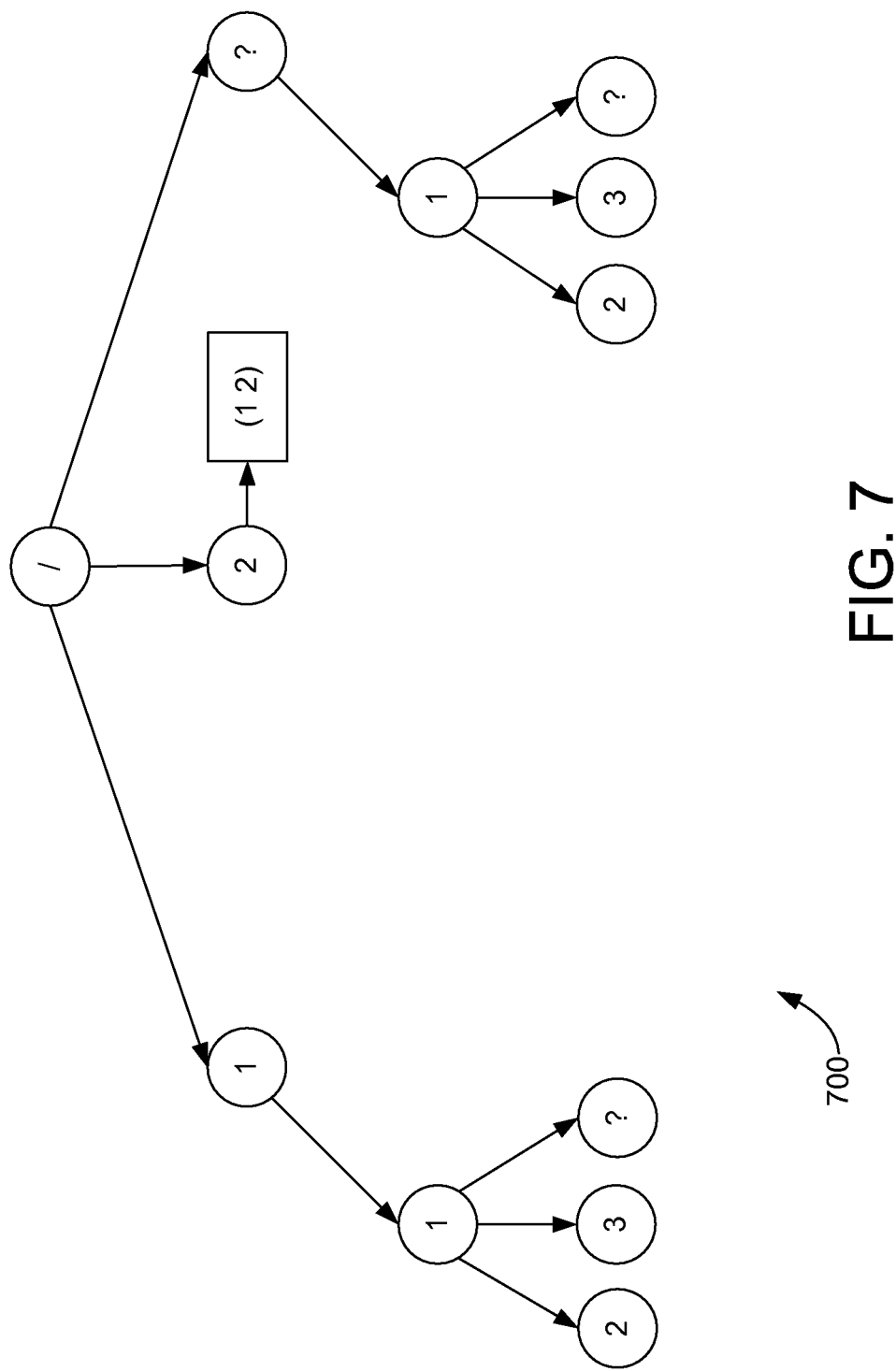

According to yet another optimization, for wildcard tree nodes traversed by fewer than a particular number of impressions, e.g., 'L' impressions, the subtrees for a node may not be built. Instead, a list of the impressions may be stored in a list. Although this removes some of the information from the tree structure, which may increase the time to retrieve information from the associated list, the size of the tree is minimized. An example of such an optimization is shown in FIG. 7, in which 'L' is set to 1, which means that any nodes representing a single web page impression can be compressed. Therefore, the subtrees having attribute values of 2, 1, 2 are compressed into a list such that the second and third attributes, with values of 1 and 2, respectively, are removed from the tree 700 and placed in a list. If the compression is done after a tree has been built (and not at the insertion time), those sub-trees that are drastically expanded may be compressed into lists. Additionally, for leafs on the last level only a counter must be stored, rather than a list.

Figure 8:
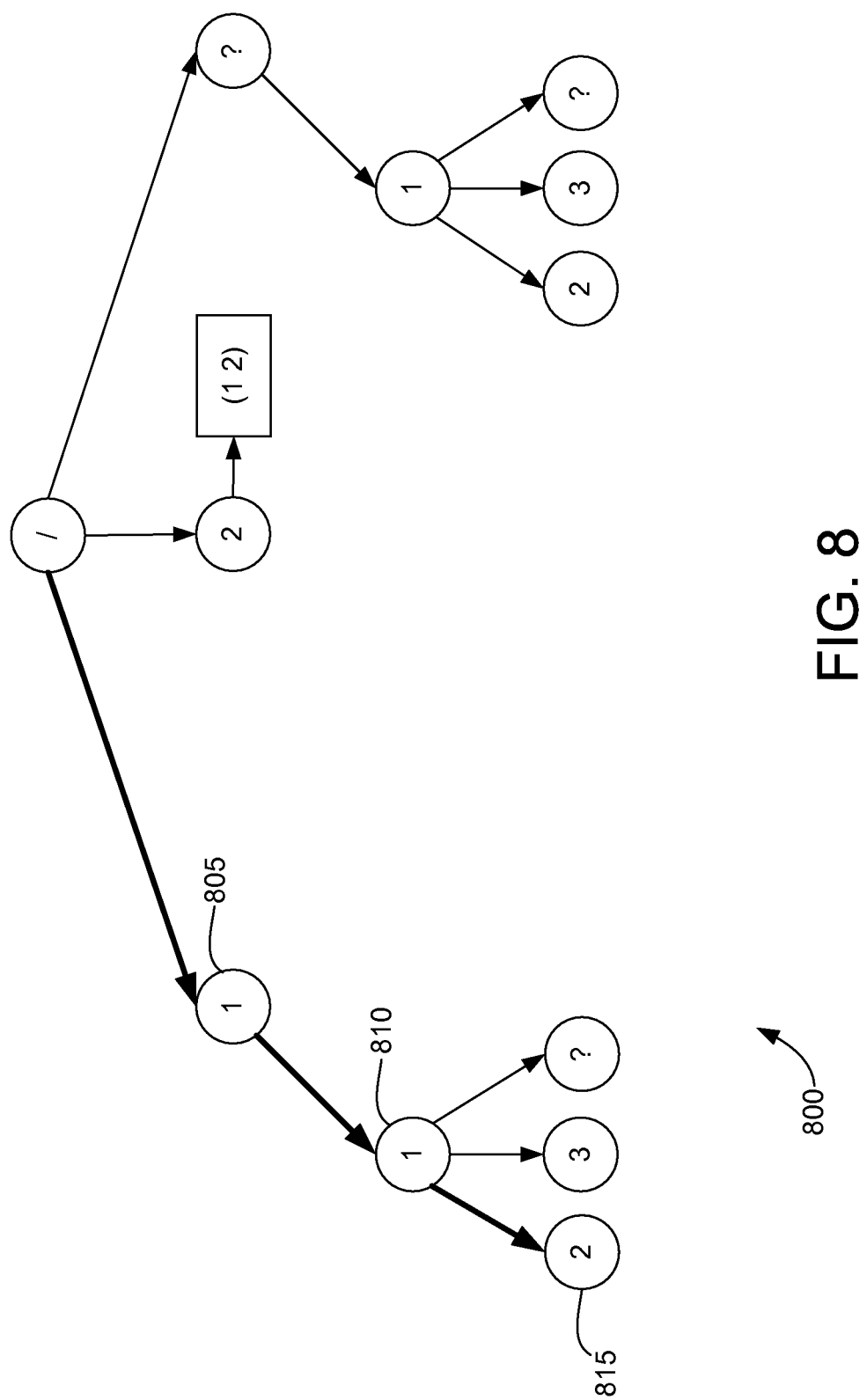
FIGS. 8-10 show example data structure paths satisfying example simple queries.

In solving a simple query using a wildcard tree, a path satisfying the query is followed, and the counter stored in the appropriate leaf is returned. For instance, FIG. 8 shows a path satisfying an example query of (1 ? 2) for three attributes. The query is applied against the optimized example tree 700 of FIG. 7. The first query attribute, 1, is satisfied by node 805. The second query attribute, ?, is a wildcard. Because the second level of nodes in the path do not include a wildcard, the path must go through the only child node 810, which is a '1'. Thereafter, the counter stored in the attribute that satisfies the leaf 815 satisfying the third query, '2', is returned.

Figure 9:
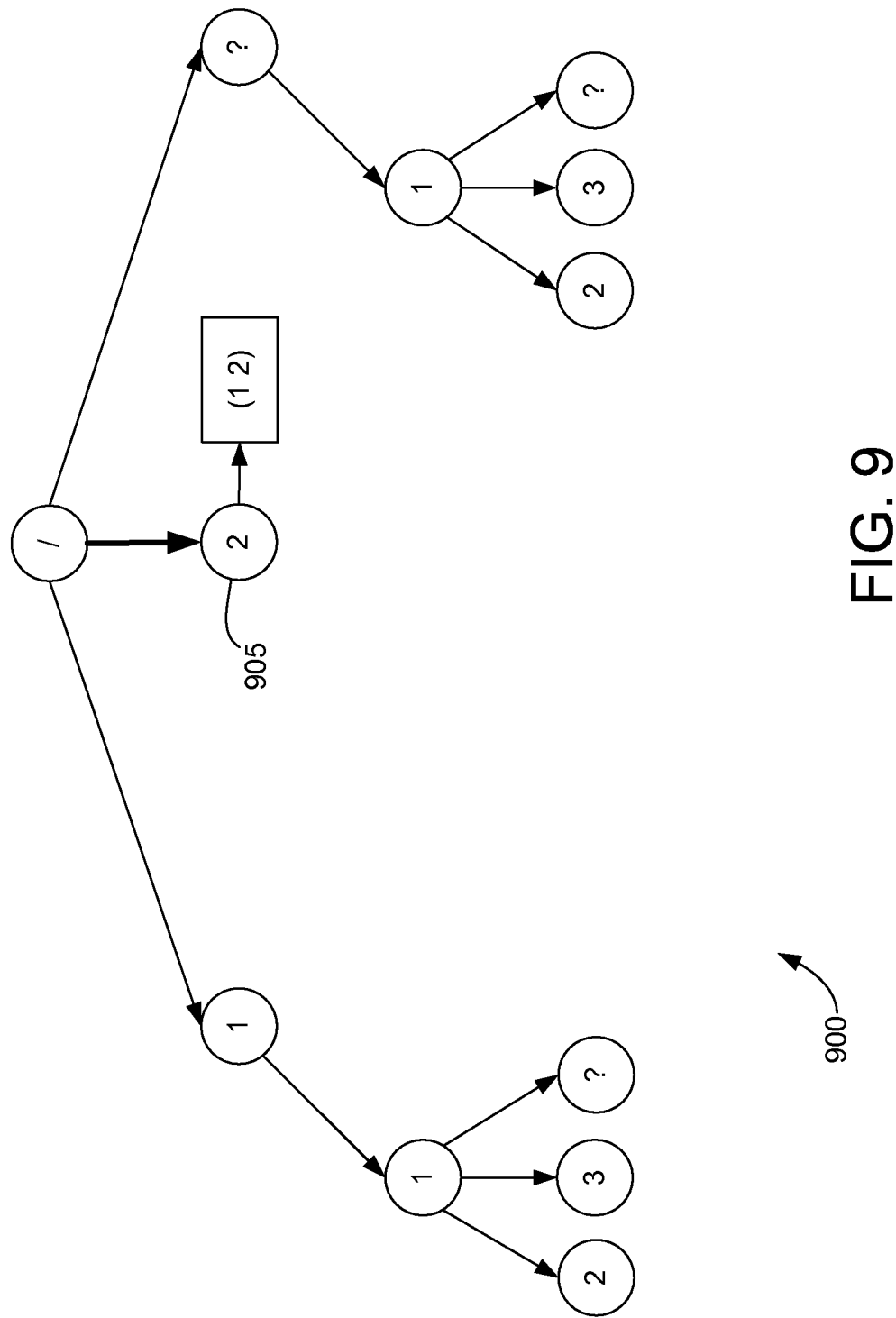
Figure 10:
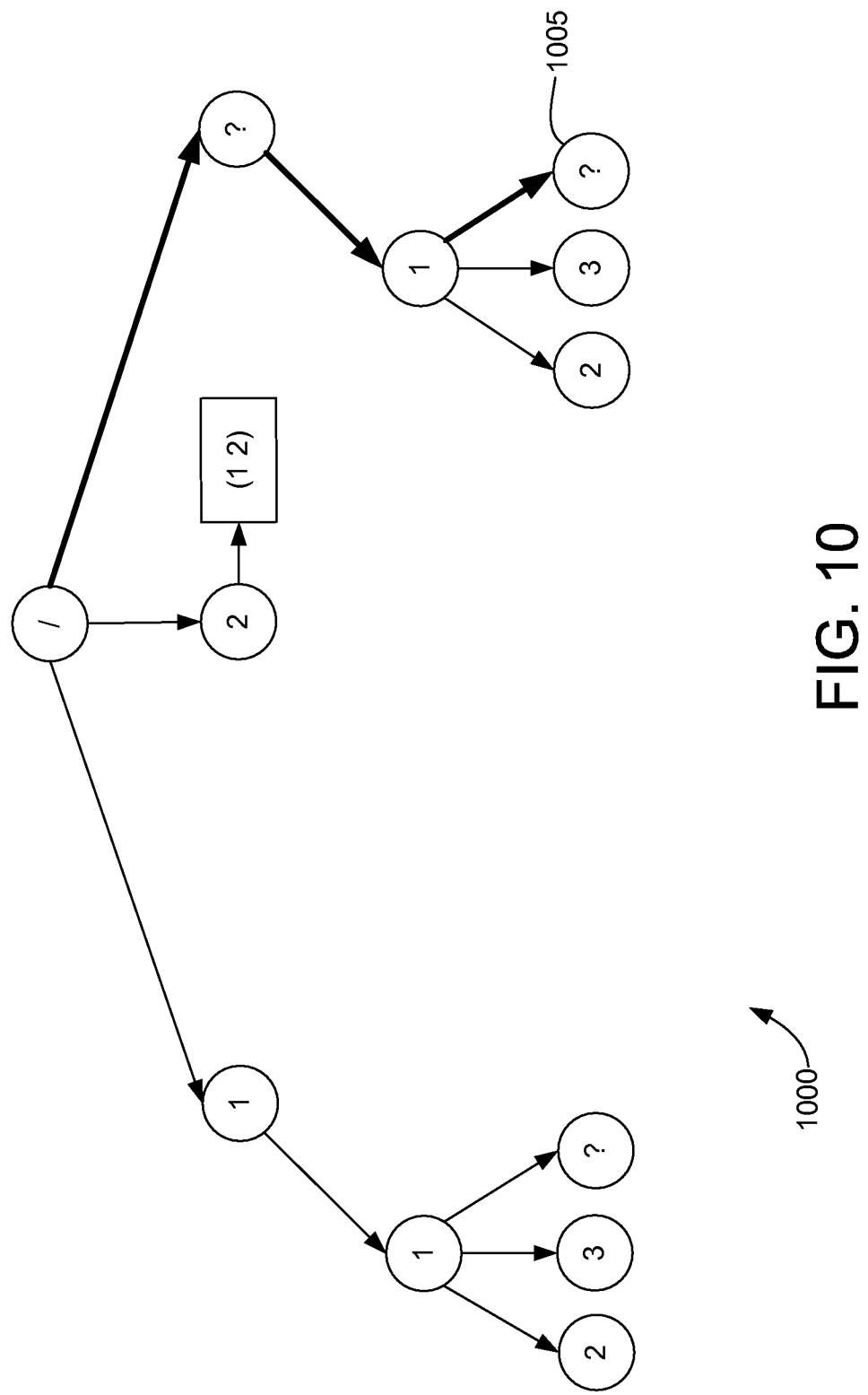

FIG. 9 shows an example query of (2 ? 2) for three attributes, which is applied against the optimized tree 700 of FIG. 7. Because the node 905 satisfying to the first query attribute value, '2', is a leaf, a list corresponding to the query is examined to determine the number of web page impressions that match the query. Because 'L' is set to 1 in this example, the answer to the query is 1. FIG. 10 illustrates yet another simple query for attributes having values (? 1 ?). In this example, the path is followed from the tree down to the last leaf 1005, which is a wildcard leaf. The counter stored in that wildcard leaf is returned as the answer.

The examples in FIGS. 8-10 represent simple queries in which values for one or more attributes are provided, resulting in the traversal of a paths in an optimized wildcard tree structure. Optimized wildcard trees of the present disclosure can also effectively solve complex queries. A complex query can be satisfied by two or more different paths in a tree, based on alternative combinations of attributes. An example complex query for web page attributes may be, for example, "How many web page impressions were displayed to users satisfying the attributes: City=Tokyo or San Francisco or Berlin; Country=US or Romania; OS=Linux or Windows; and Gender=female or male?"

In one implementation, to solve complex queries a Cartesian product is formed and the answers to each query are summed individually. For the example complex query described above, 24 different combinations exist. However, some of the combinations are impossible. For instance, a city in the United States will not satisfy a different country criteria, so the answer to the query City=Tokyo, Country=US is zero. To answer complex queries the tree must be traversed to generate all possible combinations. However, because the tree structure has been optimized, some of the combinations are no longer included in the tree.

Figure 11:
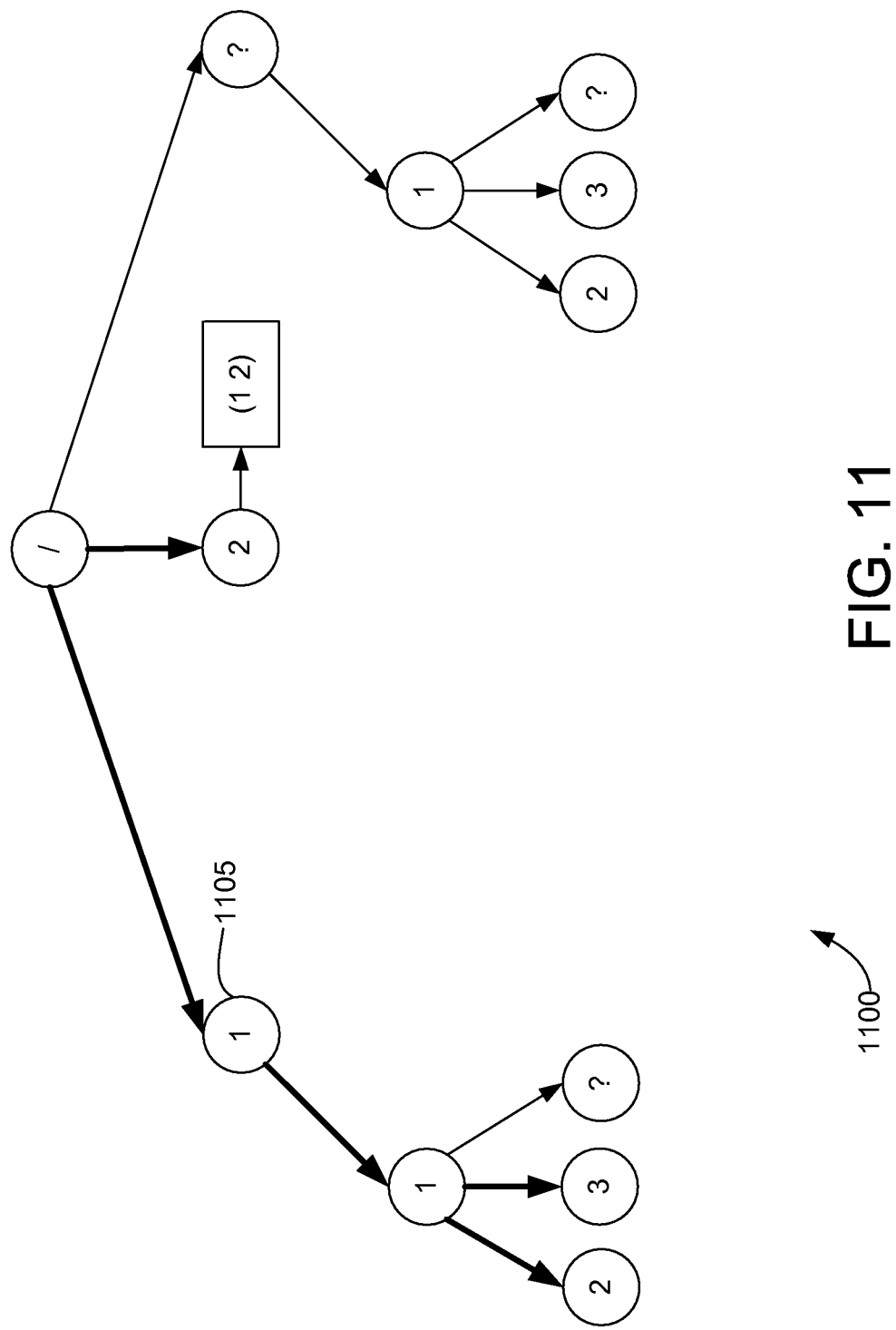
FIG. 11 shows an example data structure path satisfying an example complex query.

For instance, a complex query shown in FIG. 11 may request the number of web pages having three attributes, with values of 1 or 2 for the first attribute, 1 or 2 for the second attribute, and 2 or 3 for the third attribute. This query is applied against the example optimized tree structure described above with respect to FIG. 7. The Cartesian product satisfying the query includes the following product elements: (1 1 2), (1 1 3), (1 2 2), (1 2 3), (2 1 2), (2 1 3), (2 2 2), and (2 2 3). As shown in FIG. 11, traversing the tree structure 1100 reveals that out of the eight possible Cartesian product elements, only three of the results are retrievable because the paths are not accessible for the remaining products. For instance, in this example, the node "1" 1105 on the first level doesn't have "2" as a child so no additional searches are conducted for the queries "1 2 2" and "1 2 3". Only three out of eight combinations result using the optimized tree structure.

Additional implementations can result in further optimization to tree structures. For instance, only the necessary nodes may be stored for responding to queries with at a specified maximum number of criteria. For queries that specify more than the maximum number of criteria, approximation algorithms may be used. According to one implementation, a tree can be created to respond only to queries from recent webpage impression history, such as 30 days. This would result in a smaller tree due to the elimination of a great deal of wildcard nodes. Real-time modifications to the tree could occur where new impressions are added. Additionally, according to an implementation, data in a tree may be aggregated using an algorithm for correlating criteria, which can further optimize a tree structure.

Figure 12:
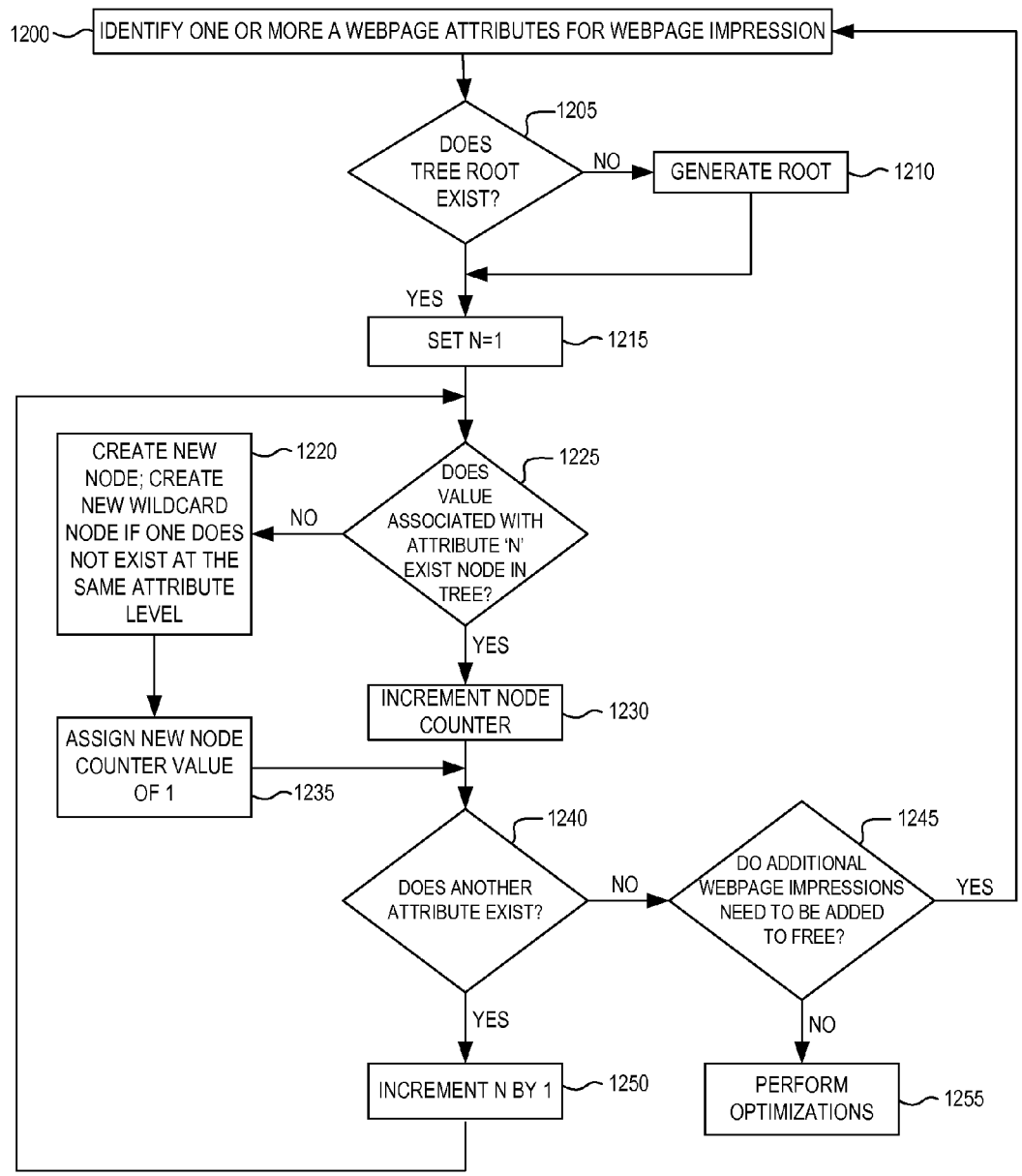
FIG. 12 is a flow chart showing an example method of building an optimized tree structure for a web page impression.

FIG. 12 is a block diagram flow chart illustrating an example method for building of an optimized tree structure for a web page impression, according to an implementation. Initially, one or more webpage attributes are identified for a webpage impression (block 1200). Thereafter, if a tree root does not exist, a root is generated (blocks 1205, 1210). Next, it is determined whether or not a value attributed with a first attribute exists in a node in the tree (blocks 1215, 1225). If so, the counter in the existing node is incremented (block 1230) to indicate that the node satisfies an attribute of the webpage impression. If a value attributed with the first attribute does not exist in a node, a new node is created (block 1220). Additionally, a new wildcard node is created if one does not exist at the same attribute level as the newly created node (block 1220). The new node is then assigned the counter value of one to indicate that it is associated with a webpage impression.

If another attribute for the webpage impression exists, the process repeats itself, whereby values associated with each attribute are added to the tree in they do not exist as nodes in the tree. After no further attributes exist, additional webpage impressions may be added to the tree by repeating the same process. After the tree is fully built, optimizations may be performed (block 1255).

Figure 13:
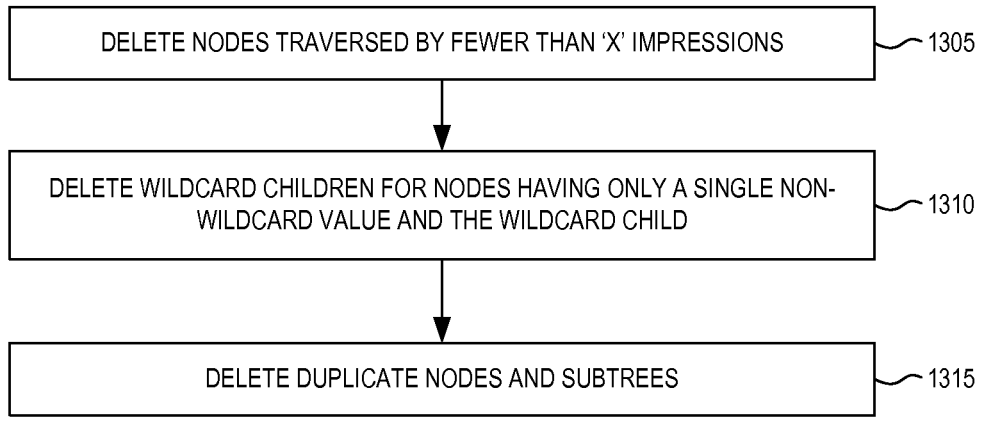
FIG. 13 is a flow chart illustrating an example optimization process.

FIG. 13 is a block diagram flow chart illustrating several optimizations that may be performed. Although three optimization methods are illustrated in FIG. 13, and as being performed in sequence, one or more of the optimizations may be preformed by themselves or in combination with another optimization. Additionally, the order in which two or more optimizations may be performed may change.

According to one implementation, nodes that are traversed by fewer than a predetermined number (e.g., a small number) of impressions may be deleted, where, for example, the predetermined number of impressions is a number considered statistically irrelevant for achieving a desired forecasting result (block 1305). For instance, the small number of impressions may be set to 10 so that a leafs having fewer than 10 impressions will be deleted. According to another optimization method, if a node has only a predetermined number of children (e.g., two, one corresponding to a non-wildcard value and one corresponding to the wildcard), the wildcard child may be deleted (block 1310). According to yet another implementation, if nodes and their subtrees share the same information as corresponding nodes, then the duplicates may be removed (block 1315).

In addition to optimizations performed after the building of an a tree, subtrees for a particular node may not be built for wildcard tree nodes traversed by fewer than a particular number of impressions, e.g., 'L' impressions. Thus, this determination may be made during the building of the tree structure described with respect to blocks 1200-1250 of FIG. 12. Instead, a list of the impressions may be stored in a list, and the list may be consulted to identify the number of webpage repressions at satisfy a query. This removes some of the information from the tree structure, but reduces the size of the tree.

Figure 14:
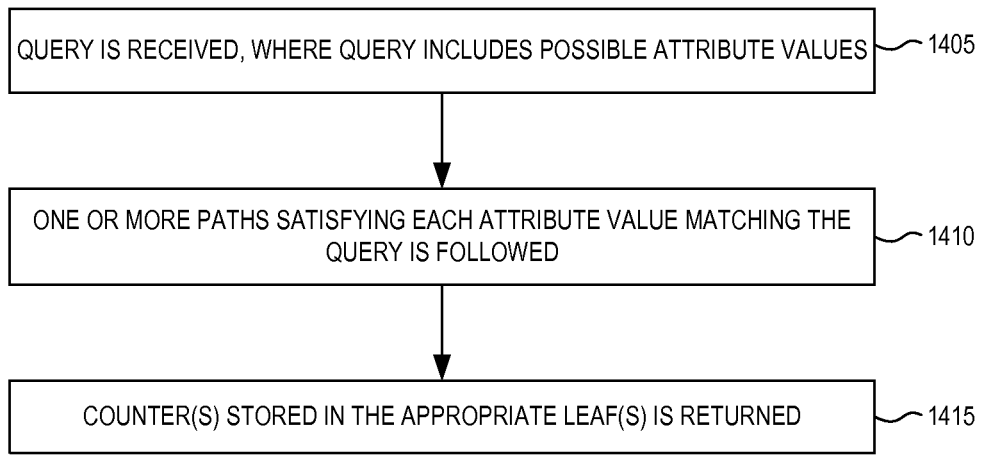
FIG. 14 is a flow chart illustrating the identification of the number of webpage impressions satisfying a query using an optimized tree structure.

FIG. 14 is a block diagram flow chart illustrating an example identification process of the number of webpage impressions satisfying a query using an optimized tree structure, according to an implementation. A query is received, where the query identifies attribute values (block 1405). Queries may be run by users seeking to identify how many webpage impressions include one or more attributes. This information may be useful, for instance, to advertisers that wish to identify how many web pages are associated with certain criteria (i.e., attributes). An optimized tree structure storing the number of web pages associated with combinations of attributes is accessed, and the one or more paths satisfying each attribute value matching the attribute values in the query, are followed.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or structural means, may also be utilized to implement corresponding software structures and algorithms, and equivalents thereof.

Many modifications and other implementations will come to mind to one skilled in the art having the benefit of the teachings presented in the foregoing descriptions and the associated drawings. Therefore, it is to be understood that the disclosure is not limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method, comprising:
identifying an impression database, the impression database including a plurality of entries, each entry associated with an impression, each impression being for a content item wherein each entry includes information associated with the impression including information related to an environment where the impression was served wherein the information related to the environment includes information related to a location where a user viewing the content item associated with the impression was located or a device used by the user to access the content item;
identifying a plurality of content item attributes developed from the information, wherein each of the plurality of content item attributes is associated with a value, the content item being a web page and the attributes being information related to an environment where the impression was served;
building a data tree based on the impression database and the plurality of content item attributes, wherein the data tree comprises a plurality of nodes, wherein each node represents a content item attribute and is associated with a quantity of content items included in the impression database that have the content item attribute;
optimizing, by one or more data processing apparatus, the data tree to generate an optimized data tree by deleting one or more of the plurality of nodes based, in part, on respective quantities associated with the one or more of the plurality of nodes and compressing the data tree including identifying one or more of the plurality of nodes that have a quantity that is less than a predetermined number and creating a list to represent the identified one or more of the plurality of nodes; and
determining, by the one or more data processing apparatus, the quantity of content items associated with the at least one of the plurality of nodes in the optimized data tree.

2. The method of claim 1, wherein a content item includes a webpage, the method further comprising receiving a query including one or more webpage attribute values.

3. The method of claim 2, further comprising identifying at least one of the plurality of nodes that satisfies the one or more webpage attribute values included in the query.

4. The method of claim 1, wherein determining the quantity of content items associated with the at least one of the plurality of nodes in the optimized data tree comprises identifying a counter value stored in the at least one of the plurality of nodes.

5. The method of claim 1, wherein a content item includes a webpage, and wherein optimizing the data tree to generate an optimized data tree comprises deleting one or more of the plurality of nodes associated with:
   a particular number of web pages; or
   fewer than the particular number of web pages.

6. The method of claim 5, wherein the particular number of web pages is set by a user.

7. The method of claim 1, wherein optimizing the data tree to generate an optimized data tree comprises deleting one or more of the plurality of nodes that are duplicative of one or more other plurality of nodes.

8. The method of claim 1, wherein one or more of the plurality of nodes comprise one or more subnodes.

9. The method of claim 8, wherein optimizing the data tree to generate an optimized data tree comprises deleting one or more of the plurality of nodes that comprise a wildcard subnode and one other subnode.

10. The method of claim 1 wherein the environment is characterized by a geographic location.

11. The method of claim 1 wherein the environment is characterized by a browser that presented the impression.

12. The method of claim 1 wherein the environment is characterized by a device on which the impression occurred.

13. The method of claim 1 wherein the environment is characterized by a user that viewed the impression.

14. A system, comprising:
one or more data processing apparatus; and
a computer-readable medium encoding computer instructions executable by the one or more data processing apparatus to perform operations including:
identifying an impression database, the impression database including a plurality of entries, each entry associated with an impression, each impression being for a content item wherein each entry includes information associated with the impression including information related to an environment where the impression was served wherein the information related to the environment includes information related to a location where a user viewing the content item associated with the impression was located or a device used by the user to access the content item;
identifying a plurality of content item attributes developed from the information, wherein each of the plurality of content item attributes is associated with a value, the content item being a web page and the attributes being information related to an environment where the impression was served;
building a data structure including a plurality of nodes based on the impression database and the plurality of content item attributes, wherein each node represents a content item attribute and is associated with a number of content items that have the content item attribute; and
optimizing the data structure including reducing the size of the data structure by deleting one or more of the plurality of nodes based, in part, on respective numbers associated with the one or more of the plurality of nodes and compressing the data tree including identifying one or more of the plurality of nodes that have a quantity that is less than a predetermined number and creating a list to represent the identified one or more of the plurality of nodes.

15. The system of claim 14, wherein a content item includes a webpage, and wherein the operations to optimize the data structure further comprise operations to determine the number of content items associated with at least one of the plurality of nodes subsequent to the optimization of the data structure.

16. The system of claim 15, wherein the operations to optimize the data structure further comprise operations to identify at least one of the plurality of nodes associated with the one or more content item attribute values that are included in a query including the one or more content item attribute values.

17. The system of claim 14, wherein the operations to optimize the data structure further comprise operations to reduce the size of the data structure by deleting one or more of the plurality of nodes associated with:
a particular number of web pages; or
fewer than the particular number of web pages.

18. The system of claim 17, wherein the particular number of web pages is set by a user.

19. The system of claim 14, wherein the operations to optimize the data structure further comprise operations to reduce the size of the data structure by deleting one or more of the plurality of nodes that are duplicative of one or more other plurality of nodes.

20. The system of claim 19, wherein one or more of the plurality of nodes comprise one or more subnodes.

21. The system of claim 20, wherein the operations to optimize the data structure further comprise operations to reduce the size of the data structure by deleting one or more of the plurality of nodes that comprise a wildcard subnode and one other subnode.

22. The system of claim 14 wherein the environment is characterized by a geographic location.

23. The system of claim 14 wherein the environment is characterized by a browser that presented the impression.

24. The system of claim 14 wherein the environment is characterized by a device on which the impression occurred.

25. The system of claim 14 wherein the environment is characterized by a user that viewed the impression.

26. A non-transitory computer-readable medium storing instructions executable by one or more data processing apparatus to effect performance of operations comprising:
identifying an impression database, the impression database including a plurality of entries, each entry associated with an impression, each impression being for a content item wherein each entry includes information associated with the impression including information about an environment where an impression was served wherein the information related to the environment includes information related to a location where a user viewing the content item associated with the impression was located or a device used by the user to access the content item;
identifying a plurality of content item attributes developed from the information, wherein each of the plurality of content item attributes is associated with a value, the content item being a web page and the attributes being information related to an environment where the content item was served;
building a data tree based on the impression database and the plurality of content item attributes, wherein the data tree comprises a plurality of nodes, wherein each node represents a content item attribute and is associated with a number of content items that have the content item attribute;
optimizing the data tree to generate an optimized data tree by deleting one or more of the plurality of nodes based, in part, on respective numbers associated with the one or more of the plurality of nodes and compressing the data tree including identifying one or more of the plurality of nodes that have a quantity that is less than a predetermined number and creating a list to represent the identified one or more of the plurality of nodes; and
determining the number of content items associated with the at least one of the plurality of nodes in the optimized data tree.

27. The medium of claim 26, wherein a content item includes a website, and the operations further comprising receiving a query including one or more webpage attribute values.

28. The medium of claim 27, the operations further comprising identifying at least one of the plurality of nodes associated with the one or more webpage attribute values included in the query.

29. The medium of claim 28, wherein the operations for determining the number of content items comprises identifying a counter value stored in the at least one of the plurality of nodes.

30. The medium of claim 26, wherein the operations for optimizing the data tree to generate an optimized data tree comprises deleting one or more of the plurality of nodes associated with:
   a particular number of web pages; or
   fewer than the particular number of web pages.

31. The medium of claim 30, wherein the particular number of web pages is set by a user.

32. The medium of claim 26, wherein the operations for optimizing the data tree to generate an optimized data tree comprises deleting one or more of the plurality of nodes that are duplicative of one or more other plurality of nodes.

33. The medium of claim 26, wherein the one or more of the plurality of nodes comprise one or more subnodes.

34. The medium of claim 33, wherein the operations for optimizing the data tree to generate an optimized data tree comprises deleting one or more of the plurality of nodes that comprise a wildcard subnode and one other subnode.

35. The medium of claim 26 wherein the environment is characterized by a geographic location.

36. The medium of claim 26 wherein the environment is characterized by a browser that presented the impression.

37. The medium of claim 26 wherein the environment is characterized by a device on which the impression occurred.

38. The medium of claim 26 wherein the environment is characterized by a user that viewed the impression.

* * * * *